Jan. 19, 1954     E. H. COLLINS     2,666,897

METHOD AND APPARATUS FOR MEASURING MOISTURE CONTENT

Filed June 28, 1948     3 Sheets—Sheet 1

INVENTOR.
ERNEST HOBART COLLINS

BY Cook and Ackermerhorn

ATTORNEYS

Jan. 19, 1954　　　E. H. COLLINS　　　2,666,897
METHOD AND APPARATUS FOR MEASURING MOISTURE CONTENT
Filed June 28, 1948　　　3 Sheets-Sheet 2

INVENTOR
ERNEST HOBART COLLINS
BY Cook and Schermerhorn
ATTORNEYS

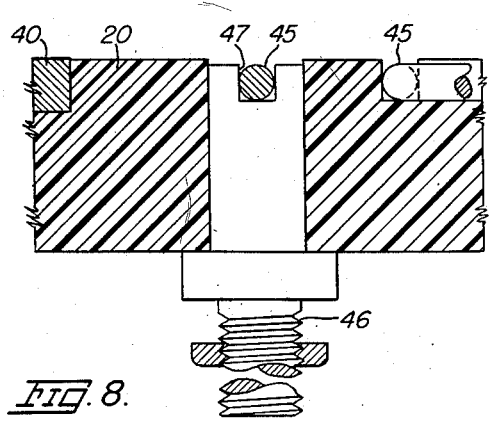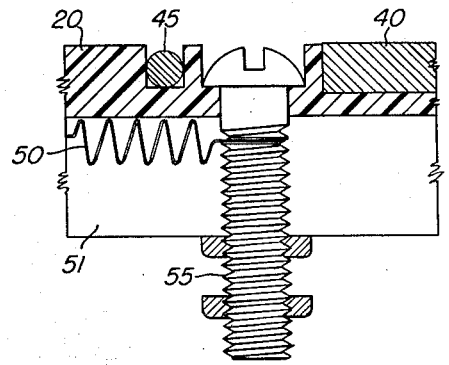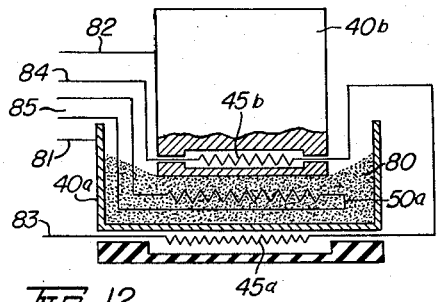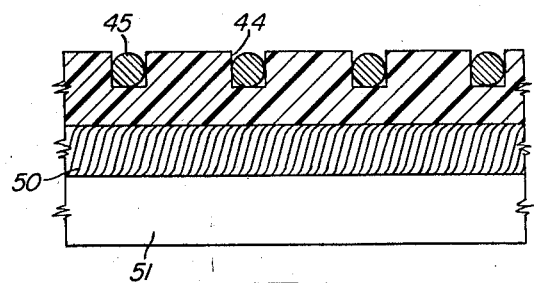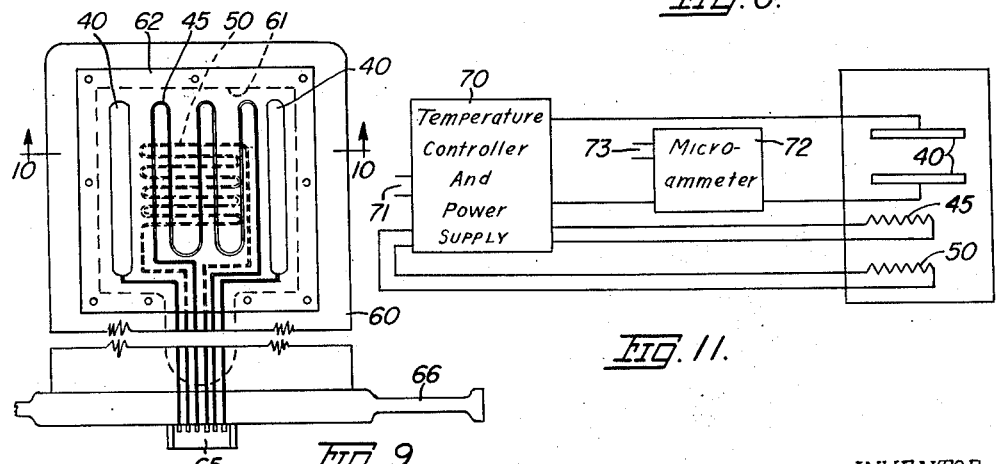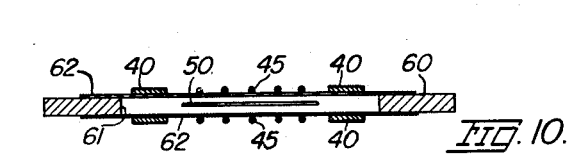

Patented Jan. 19, 1954

2,666,897

UNITED STATES PATENT OFFICE 2,666,897

METHOD AND APPARATUS FOR MEASURING MOISTURE CONTENT

Ernest Hobart Collins, Kelso, Wash., assignor to Weyerhaeuser Timber Company, Longview, Wash., a corporation of Washington Application June 28, 1948, Serial No. 35,583

14 Claims. (Cl. 324—65)

This invention relates to the measurement of moisture content and has particular application to materials of very low moisture content.

The conventional method of determining low values of moisture content involves the weighing, oven drying and reweighing of samples, which procedure is so time-consuming that it has little utility as a control test. Such test is also a destructive test. Present known electrical tests which are reliable are strictly limited to the measurement of moisture contents above about 7%. Various electrical meters have heretofore been devised especially for wood, which measures changes in electrical resistance, capacitance, or radio frequency power loss produced by changes in moisture content, but it is found that the structural features of wood itself also affect these electrical characteristics to such an extent that at low moisture contents the variations in woody structure produce greater effects than do the changes in moisture content.

Numerous industrial processes require the measurement or control of the moisture content of materials in the range below 7%. For example, in the manufacture of plywood using certain kinds of synthetic resins as adhesives to bond the veneers in a high temperature hot press, the moisture content of the wood should be controlled between 1% and 5%. It is found in practice that moisture contents above this range produce poor glue bonds characterized by delaminations, steam pockets and other defects, and that moisture contents below this range are likewise not conducive to good bonding. It is obviously desirable in such an industrial process to utilize a quick, non-destructive moisture content test rather than the customary slow drying and reweighing procedure.

The general objects of the present invention are, therefore, to provide an improved method and apparatus for testing the moisture content of materials in the range between about 1% and 7%; and to provide a test for this purpose which is non-destructive and relatively quick, to serve as a control test for wood and other cellulosic materials, and other materials which behave and respond like cellulosic materials, for controlling drying ovens and other apparatus in the manufacture of products from such materials. In accomplishing the broad objects of the invention, other objects are to provide a method and means for increasing the electrical conductance and improving the correlation between conductance and moisture content of a relatively dry and non-conductive material so that it will pass an accurately measurable electric current which is a function of moisture content, and, more specifically, to improve the electrical conductivity and moisture content correlation by heating the material, or at least an area of the surface of the material, so that the electrical conductance, resistance, or other electrical characteristics of the material may be accurately measured to indicate moisture content. Another object is to provide relatively simple and reliable forms of apparatus for carrying out the method of the invention, suitable for control and other testing of different materials including wood, wood veneer, plywood, bark, bark products, molding compounds and the like, particularly apparatus for the measurement of direct current conductance or resistance at elevated temperature.

The process of the invention involves the heating of the material, or at least a portion of the surface thereof in the region of the test, to increase the electrical conductivity of the material in that region so that an accurately measurable current may be passed between two electrodes applied to the material. Also, since the electrodes are usually, in the practical case, slightly cooler than the heated region, the conductivity may be increased by moisture driven from the heated region and condensed on the surface and in the region nearer the electrodes. At moisture contents above about 7% the electrical conductance of wood may be measured at ambient temperature to provide a satisfactory indication of the moisture content, but when the wood is dried to a moisture content less than this value it has such a high resistance that electrical measurements are made difficult and also unreliable because of the greater effect of structural variations upon the electrical characteristics. It is found that heating the wood not only increases its conductivity but also restores the correlation between conductivity and moisture content so that small percentage changes in moisture content produce measureable and significant variations in the electrical characteristics. The practical beneficial effect of heating is, therefore, to magnify the variation in conductivity at different moisture contents in this low range. Any other electrical characteristic such as capacitance, dielectric constant, dielectric loss factor, dissipative factor or power factor at any frequency including those near the relaxation frequency of the molecules involved, sonic and radio frequencies, may be utilized in practicing the invention but direct current conductance and resistance measurements are described by way of example to illustrate the broad principles of the invention.

It is important to note that the temperature of wood may be raised for this purpose to a value well above the boiling point of water, 300° F. giving good results and satisfactory sensitivity where the moisture content is very low. As a practical matter, the temperature must not exceed that value which would scorch or damage the material, which, in the case of wood, is about 375° F. Although, in general, it is recognized that the application of heat drives moisture out of wood, the heating of relatively dry wood for a short period of time changes the electrical characteristics so greatly that measurements of slightly decreased moisture content are still possible. At low moisture content the remaining water molecules have such a great affinity for wood structure that heat alone will not separate them readily, even at a temperature considerably above the boiling point of water. Advantage is thereby taken of the increased electrical conductivity resulting from the heating of the wood without introducing a significant error through loss of the moisture which is being measured.

The apparatus for carrying out the method may take various forms, but the preferred embodiments for measuring the moisture content of wood veneer and the like comprise a veneer contactor element in the form of a base plate having spaced electrodes to contact a surface or surfaces of the veneer. Between the electrodes, the base plate carries a heating element to raise the temperature of the veneer in the path traversed by the measuring current which results from an electrical potential impressed upon the electrodes. The base plate also carries a thermal sensitive element mounted in heat transfer relation with the heating element and veneer to provide an indication of the wood temperature in the heated zone, this sensitive element constituting the primary control element of a temperature control circuit. When a predetermined temperature is attained, the value of the current flowing through the material between the electrodes is measured by a sensitive meter which may thereby be calibrated directly in percentage moisture content.

In one of the illustrated embodiments, the veneer contactor element containing the above described electrical elements is mounted on a base member to project under a veneer sheet to be tested, and a weight is lowered on the upper side of the sheet to press the under face of the sheet against the electrodes with the same force in every measurement. The time required to obtain a reading is from one to two minutes, which is sufficiently fast to enable the device to be used as a control or spot test at the discharge end of a veneer drier oven, so that immediate change of drier controls may be made whenever necessary. The time limitations on reading the instrument are not critical as a much longer time is required before any error is introduced from the drying action of the heating element. The same type of spot test device may also be employed at any other stage in production where it is desired to know the moisture content of the wood, and it may likewise be applied to other materials which exhibit a behavior similar to wood for test purposes.

Another embodiment of apparatus is adapted to serve as a probe tester having a veneer contactor element to be inserted in a stack of veneer or the like when it is piled for storage. For this purpose a thin flat base plate is provided with pairs of electrodes on its opposite faces to contact veneers above and below the probe, and the electrodes, heating element and thermal sensitive element are connected with contact pins in a handle portion of the probe which is left extending from the pile of veneer.

The principles of the invention may also be applied in the testing of material which is already at a sufficiently elevated temperature, as in a dry kiln, in which case the probe or spot tester need not necessarily be equipped with a heating element. The electrical meter may then be calibrated for different temperatures as indicated by the thermal sensitive element.

The method is further applicable to loose material and suitable apparatus is described and illustrated for testing such material.

The foregoing and other objects will be apparent and the invention will be better understood from the detailed description in the following specification with reference to the accompanying drawings illustrating certain preferred embodiments of the invention. It is to be understood, however, that the drawings are merely for the purpose of illustrating the invention, and are not intended to limit the invention, as various changes in the method and in the construction and arrangement of parts of the apparatus will occur to persons skilled in the art, and all such modifications within the scope of the appended claims are included in the invention.

In the drawings:

Figure 6 is an enlarged fragmentary sectional view of a portion of the structure shown in Figure 5;

Figure 7 is an enlarged fragmentary sectional view taken on the line 7—7 of Figure 3;

Figure 8 is an enlarged fragmentary sectional view taken on the line 8—8 of Figure 3;

Figure 9 is a plan view of a contactor element for a veneer probe test device embodying the principles of the invention;

Figure 10 is a cross sectional view taken on the line 10—10 of Figure 9;

Figure 11 is a diagrammatic view of the electrical system; and

Figure 12 is a diagrammatic sectional view of an apparatus for testing loose or comminuted material.

Figure 2:
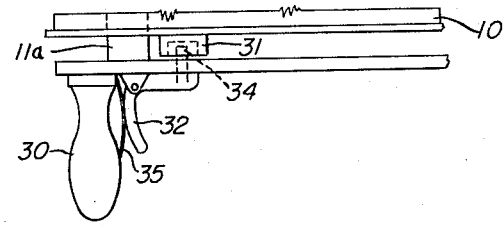
Figure 2 is a fragmentary plan view showing details of the handle latching mechanism on the apparatus of Figure 1.
Figure 1:
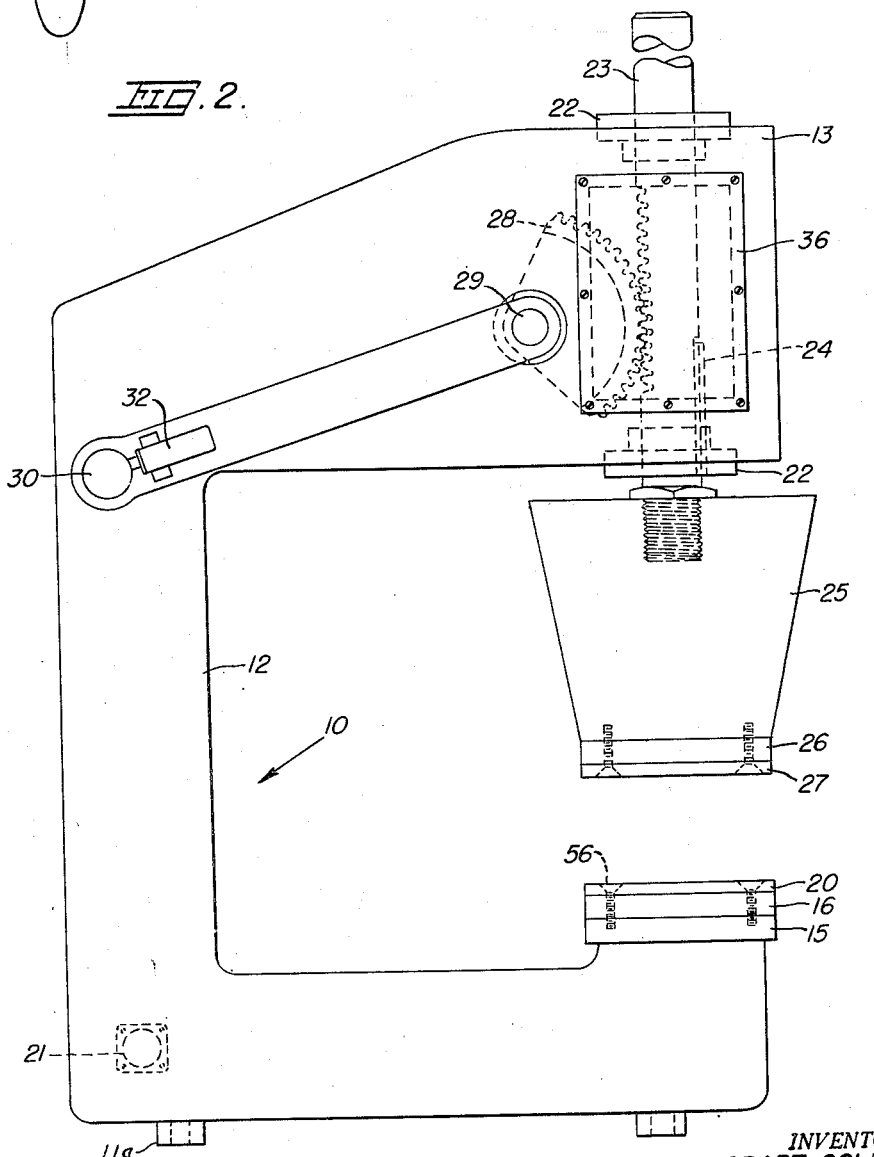
Figure 1 is a side elevation view of a veneer spot test apparatus for carrying out the method of the invention.
Figure 3:
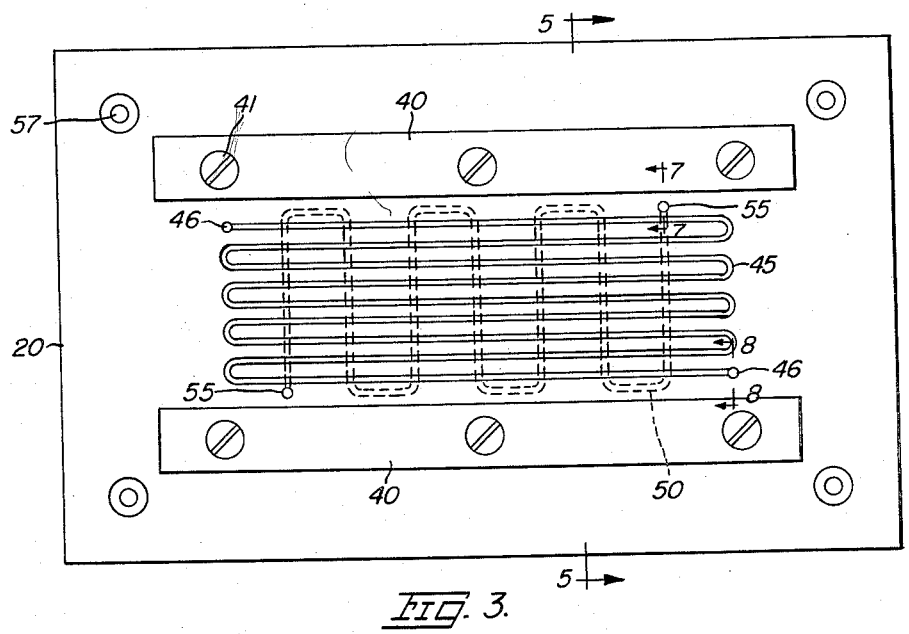
Figure 3 is a top plan view of the veneer contactor element shown in Figure 1.
Figure 4:
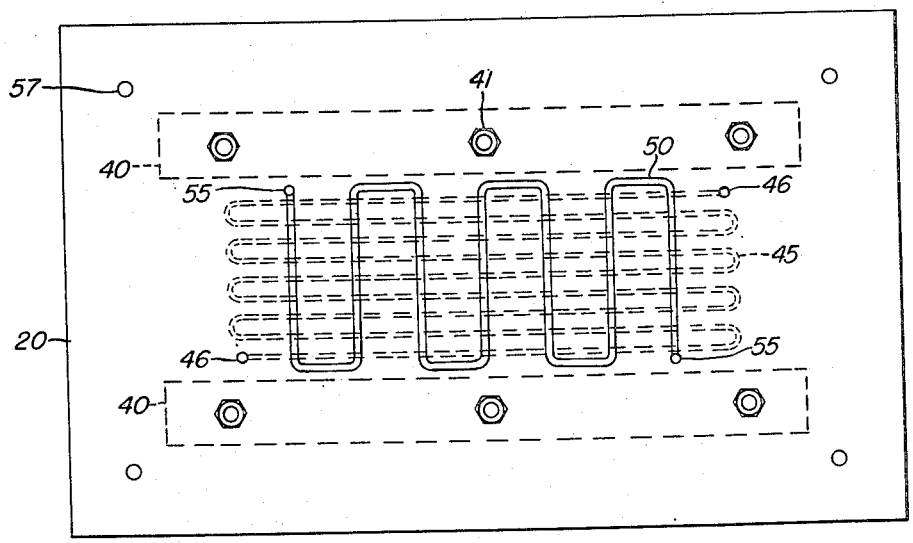
Figure 4 is a bottom plan view of the veneer contactor element.
Figure 5:
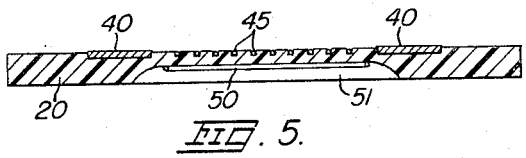
Figure 5 is a cross sectional view of the contactor element, taken on the line 5—5 of Figure 3.

Referring first to Figure 1, the numeral 10 designates, generally, a housing having a base 11, a column 12 and a head 13. The base is equipped with bars or plates 11a to secure the housing to a suitable support. On the base is mounted a horizontal table plate 15 which is covered with an insulating board 16 of asbestos and the like and a platen 20, having high insulation value at high temperatures, on which is mounted the electrical elements of the testing device to be associated and engaged with the material to perform a spot test. The platen 20 constitutes the veneer contactor element and has a flat horizontal top face to engage the under surface of the wood veneer or the like to be tested. An electrical receptacle 21 provides for plug connection with the electrical elements on the platen 20.

The head 13 is provided with bushings 22 to guide a shaft 23 for vertical travel, the lower bushing having a keyway for a key 24 to prevent rotation of the shaft. On the lower end of the shaft 23 there is mounted a weight block 25 carrying an insulating board 26 similar to the insulating board 16, and an upper platen 27 of the same material as the platen 20 and having a flat lower face parallel with the top face of the platen 20. The function of the platen 27 and weight block 25 is to engage the top surface of the flexible veneer to hold it flat against the lower platen with the same contact pressure on the electrodes in each test.

The shaft 23 and weight block are raised by a gear sector 28 on a shaft 29 having a crank handle 30. The weight block may be held in elevated position by a latch on the handle arranged to engage a setblock 31 on the body 10 when the parts are in the position shown in Figure 1. The latch parts comprise a latch member 32 pivotally mounted on a pin 33 in the handle and having a lock pin 34 to engage in the setblock 31. A spring 35 holds the latch member releasably in its latched position. When the weight block is lowered the handle is unrestrained to allow the weight block to rest freely on the material being tested. The numeral 36 designates a removable cover plate for an opening to provide access to the internal parts of the lifting mechanism just described.

The details of construction of the platen 20 constituting the veneer contactor element are shown in Figures 3 to 8. A pair of spaced parallel electrodes 40 are mounted in the flat upper face of the platen 20 with the surface of the electrodes raised slightly above the surface of the platen. Electrical connection is made with the electrodes 40 through certain of the screws 41 used to secure the electrodes to the platen. Between the electrodes 40 the top surface of the platen is provided with a number of parallel grooves 44 to contain a heating resistor wire 45 in such disposition that the major portion of the area between the electrodes will be substantially uniformly heated. In the present embodiment the electrodes 40 are somewhat longer than the length of the heated area. The wire 45 snugly fits the sides and bottoms of the grooves 44 which have a width and depth equal to the diameter of the round wire. The wire is preferably cemented in the grooves, leaving the top of the wire exposed and bare. The ends of the heater wire 45 are connected with terminals 46 as shown in Figure 8. The terminals are inserted through holes in the platen 20, and each terminal has a slot 47 in its upper end to register with a groove 44, so that the ends of the wire 45 may be silver soldered or brazed in the slots 47. The above described arrangement of the heater wire places the bare wire almost in contact with the under surface of the veneer when the weight block is lowered to press the veneer against the electrodes 40.

The temperature is measured or controlled by a thermal sensitive resistance thermometer element comprising a coil of fine wire 50 disposed in deep grooves 51 of a width to fit the coils on the under side of the platen directly beneath and close to the heater wire. The grooves 51 are disposed to cover the same general area as the heater wire to provide an indication of average temperature over the heated area. The opposite ends of the wire 50 are connected with terminal screws 55 as shown in Figure 7. The arrangement is such that the temperature of the thermal sensitive element 50 is approximately the same as the wood surface temperature, depending upon the existing temperature gradients, whereby when the heating element is controlled to maintain a constant temperature in the wire 50 the wood surface is likewise maintained at constant temperature.

For plywood veneer the electrodes preferably have a lateral spacing of between one and two inches and a length of several inches substantially in the proportions shown in the drawing, whereby the electrode potential is impressed across a heated area of sufficient extent on the surface of the wood veneer to pass a measurable current through wood of less than 7% moisture content at an elevated temperature. The veneer contactor element embodied in platen 20 is mounted on the base 11 by means of screws 56 in holes 57 to place the electrodes 40 in contact with the veneer so that current flows by diverse paths through the veneer.

The veneer may be heated in any convenient manner, as by steam heated platens or by high frequency dielectric heating, in addition to the form of electrically heated platen shown. In the veneer spot test apparatus shown in Figure 1 it is preferred to provide sufficient heat output in the heating element 45 to raise the temperature of ⅛" veneer from ambient temperature to 300° F. within about two minutes. This temperature is then maintained by the thermal sensitive element 50 so that a stable operating condition with a steady electrode current may be obtained before taking a reading. These values of dimension, time and temperature are cited merely by way of example, however, as they are not critical and may be varied widely with satisfactory results.

Figures 9 and 10 illustrate a probe tester in the form of a veneer contactor element to be inserted in a stack of veneer or the like when it is piled for storage. The base member in this embodiment comprises a flat steel plate 60 having a large opening 61 covered on its opposite sides by a pair of insulating plates 62 of mica. Two pairs of spaced electrodes 40 are secured to the mica sheets on opposed sides of the probe in the manner shown to contact the veneers immediately above and below the probe. Mounted on each of the mica sheets between the electrodes of each pair is a heating element 45 which may comprise a resistance wire threaded from side to side or otherwise attached to the mica sheet in convolutions to heat substantially uniformly the area between the electrodes. The thermal sensitive resistance wire 50 is contained in the space between the two insulating sheets to respond to the temperature of the heating elements and adjacent veneers. The wires leading from these various electrical elements are brought out to a terminal connector 65 on an outer end of the plate 60 which is adapted to be left extending slightly from the stack of veneer. This outer end of the plate 60 is equipped with a handle 66 which may serve as a support for the connector 65.

Figure 11 is a schematic diagram of the electrical system associated with the veneer contactor elements in the apparatus of Figures 1 and 9, and also intended for use with the apparatus shown in Figure 12, to be presently described. A temperature controller and power supply unit 70 is connected with a 115 volt A. C. supply 71. The heating element 45 is energized from the power supply unit 70 under the control of the thermal sensitive resistance 50 in a thyratron circuit to supply either pulsating direct current or alternating current to maintain a temperature of 300° F. The nature of the material being tested will determine the size and spacing of the electrodes 40 and the voltage applied thereto. For testing wood veneer with an electrode spacing of between 1 and 2 inches, as hereinabove described, a potential of about 350 volts D. C. is used, but this voltage is not critical. The current flow through the wood in the electrode circuit is measured by a vacuum tube microammeter 72 having its own 115 volt A. C. power supply 73. Alternating current potential may be applied to the electrodes 40, in which case an alternating current measuring system would be substituted for the vacuum tube microammeter 72. An alternating current supply for the electrodes would introduce capacitance and dielectric loss effects which would have to be taken into consideration for the determination of moisture content evaluation.

When the wood surface attains a temperature of about 300° F., sufficient current passes between the electrodes substantially to eliminate error from variation in the wood structure and provide a reliable indication of the moisture content over the range between 1% and 7%.

Over a wide range of moisture contents excluding only the very low moisture contents, the calibration depends upon a semi-logarithmic relationship between electrical conductivity and moisture content, the logarithm of the electrical conductivity being a linear function of the moisture content at a given temperature. In the very low moisture content range the logarithm of the conductivity departs from the linear relationship, decreasing more rapidly.

For Douglas fir, heartwood ⅛" veneer, 300° F., an increase of about ½% moisture content doubles the electrical conductivity reading on the spot test equipment of Figure 1 and a rapid decrease in conductivity occurs in the range of 0 to 2% moisture content. Different calibrations (microammeter readings as a function of moisture content) are required for different materials, for woods of different species, and for heartwood and sap wood. In the spot test the calibration varies sightly for different thicknesses of veneer, but is, for practical purposes, independent of grain direction.

Figure 12 is a diagrammatic representation of an apparatus for applying the method of the invention to relatively dry loose material such as a bark product 80 obtained from ground bark. The loose material is placed around a temperature responsive element 50a in a metallic container 40a and settled by tapping or vibrating the container by a standardized procedure. Then the metallic weight block 40b is placed on the material in the manner shown so that the container 40a and weight block 40b constitute electrodes which may be connected in the circuit of a vacuum tube microammeter as shown in Figure 11, or in the circuit of a sensitive galvanometer, to measure the conductance of the material when a suitable voltage is applied to the electrodes. The numerals 81 and 82 designate the circuit wires for these electrodes. The material 80 is heated from the bottom by a heating element 45a in the bottom of the container 40a and the material is heated from the top by a heating element 45b in the weight block 40b, the terminal connections for the heating circuit being designated at 83 and 84. The temperature responsive element 50a preferably comprises a thermal sensitive resistance element of a resistance thermometer to indicate the temperature in the center of the mass of material, the circuit connections for this element being indicated at 85.

When the moisture content of the loose material 80 is so low that its conductance between the electrodes 40a and 40b does not provide a satisfactory indication of moisture content, the conductivity of the material may be increased, and the correlation between conductance and moisture content may be improved, by energizing the heating elements 45a and 45b under the control of the thermal sensitive element 50a by the apparatus shown in Figure 11 to heat the mass of material to a predetermined elevated temperature in the same general manner and procedure as hereinabove described for veneer and other solid materials. The current passing between the electrodes 40a and 40b at a specified voltage then provides a significant indication of moisture content. By adopting a standardized test procedure the current values may be calibrated in, or converted into, terms of moisture content.

Other forms of apparatus may be devised for testing other cellulosic materials and for testing other materials where the conductivity is increased, and the correlation between conductance and moisture content is improved, by heating. For the purposes of the present method such other materials may be said to behave like cellulosic materials. The invention is not limited to the measurement of moisture contents below 7%. Broadly, the present method and apparatus provides for the measurement of temperature and electrical conductivity at the same time, over a wide range, even when it may not be necessary to apply heating effects to obtain a measurable current flow.

Having now described my invention and in what manner the same may be used, what I claim as new and desire to protect by Letters Patent is:

1. The method of determining low values of moisture content of a low-conductive, water absorbent material in a solid state comprising presenting a pair of electrodes to the material in spaced relation, applying a weight to said electrodes and material to hold the electrodes and material in contact with predetermined force which is insufficient to compress the material to a substantially greater density, applying heat to the material between said electrodes to raise the temperature of said material to at least approximately 300° F., and measuring the conductance of the material between the electrodes.

2. The method of electrically determining the moisture content of wood veneer and the like which is too dry to conduct a measurable electrical current at ambient temperature comprising pressing spaced electrodes against one surface of said wood, heating said one surface between said electrodes to at least approximately 300° F. to increase its conductance to a measurable value, and applying an electrical potential across said electrodes to measure the conductance of the wood between the electrodes at said temperature.

3. In a moisture meter, a flat insulating plate, a pair of spaced electrodes mounted on one face of said plate and arranged to include material to be tested in a measuring circuit, a heating element disposed in said plate between said electrodes, and a thermal sensitive element mounted on said plate in thermal relation with said heating element.

4. In a moisture meter, a flat insulating plate, a pair of spaced electrodes mounted on one side of said plate and arranged to include material to be tested in a measuring circuit, a heating element mounted on said side of said plate between said electrodes, and a thermal responsive element mounted on the back side of said plate and extending over an area substantially coextensive with the area covered by said heating element.

5. In a moisture meter, a pair of electrodes arranged to engage material to be tested, heating means arranged to heat the material between the electrodes, and a weight engageable with said material to press said material against the electrodes.

6. In a moisture meter, a supporting plate to engage the under surface of sheet material to be tested, a pair of spaced electrodes on said plate to engage said under surface, heating means on said plate between said electrodes, and means mounted for vertical movement above said plate to press said material against said electrodes with a uniform predetermined force in each test.

7. In a moisture meter for loose, particulate material, a bottom electrode to support a quantity of the material to be tested, a top electrode to engage the top surface of said material, means to press said top electrode down against the material with a uniform predetermined force in each test insufficient to compress the material to a substantially greater density, heating elements in said electrodes, and a thermal sensitive element responsive to the temperature of the material between the electrodes.

8. The method of determining low values of moisture content of wood comprising interposing the wood as a control element in cooperative relationship with circuit elements of an electrical measuring circuit responsive to an electrical characteristic of the wood, heating said wood to a predetermined temperature sufficiently above ambient to produce a measurable response in said circuit in the absence of pressure sufficient to compress the wood, and then measuring the response of said circuit to the wood while in said heated condition.

9. The method of determining low values of moisture content of wood comprising interposing the wood as a control element in cooperative relationship with circuit elements of an electrical measuring circuit responsive to an electrical characteristic of the wood, heating said wood to a temperature of at least approximately 300° F., and then measuring the response of said circuit to the wood while in said heated condition.

10. The method of electrically determining the moisture content of wood veneer which is too dry to conduct a measurable electric current at ambient temperature comprising pressing a pair of spaced electrodes against a surface of said veneer with a predetermined force which is insufficient to substantially compress the material, heating said surface between said electrodes to a predetermined temperature sufficient to increase its conductance to a measurable value, and impressing an electrical potential across said electrodes to measure the conductance of the heated material between the electrodes.

11. The method of determining low values of moisture content of a low-conductive, water absorbent material in a solid state comprising pressing a pair of electrodes against the material with a predetermined force which is insufficient to compress the material to a substantially greater density, applying heat to the material to raise the temperature of the material between the electrodes to a value of at least approximately 300° F., and then measuring an electrical characteristic of the material between said electrodes while the material is in heated condition.

12. The method of determining low values of moisture content of a low-conductive, water absorbent material in a solid state comprising presenting a pair of electrodes to the material to include at least a portion of the material in a field between the electrodes, applying heat to the material to raise the temperature of the material between the electrodes to a value of at least approximately 300° F., and then measuring an electrical characteristic of the material in heated condition.

13. The method of determining low values of moisture content of a low-conductive, water absorbent material in a solid state comprising interposing said material as a control element in cooperative relationship with circuit elements of an electrical measuring circuit responsive to an electrical characteristic of the material, heating said material to a temperature of at least approximately 300° F. in the absence of any mechanical pressure which would compress the material to a substantially increased density, and then measuring the response of said measuring circuit to an electrical characteristic of the material while in heated condition.

14. The method of determining low values of moisture content of a low-conductive, water absorbent material in a solid state comprising presenting a pair of electrodes to said material, heating the material between the electrodes to a temperature of at least approximately 300° F., and then measuring an electrical characteristic of the material while in heated condition.

ERNEST HOBART COLLINS.

References Cited in the file of this patent

UNITED STATES PATENTS

| Number | Name | Date |
|---|---|---|
| 1,696,684 | Knopp | Dec. 25, 1928 |
| 1,721,374 | Dantsizen | July 16, 1929 |
| 1,961,965 | Fisher | June 5, 1934 |
| 2,082,364 | Store | June 1, 1937 |
| 2,122,578 | McMaster et al. | July 5, 1938 |
| 2,148,407 | Pierson | Feb. 21, 1939 |
| 2,260,840 | Rowe | Oct. 28, 1941 |
| 2,499,626 | Bowman | Mar. 7, 1950 |
| 2,520,394 | Franzen-Lutz et al. | Aug. 29, 1950 |